US012272253B2

(12) United States Patent
Shu-Zhong Cabos et al.

(10) Patent No.: US 12,272,253 B2
(45) Date of Patent: Apr. 8, 2025

(54) SYSTEMS AND METHODS FOR DETERMINING A PHASE OF FLIGHT OF AN AIRCRAFT

(71) Applicant: THE BOEING COMPANY, Chicago, IL (US)

(72) Inventors: Ralf Rene Shu-Zhong Cabos, Hainburg Hesse (DE); Andreas Sindlinger, Weinheim Baden-Wurttemberg (DE); Sabine Rath, Zwingenberg Hessia (DE); Jennifer Mayer, Hasselroth Hessia (DE)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 17/652,703

(22) Filed: Feb. 28, 2022

(65) Prior Publication Data

US 2023/0274650 A1 Aug. 31, 2023

(51) Int. Cl.
*G08G 5/00* (2006.01)

(52) U.S. Cl.
CPC ........... *G08G 5/003* (2013.01); *G08G 5/0021* (2013.01); *G08G 5/0052* (2013.01)

(58) Field of Classification Search
CPC .... G08G 5/003; G08G 5/0021; G08G 5/0052; G08G 5/0043; G08G 5/0082; G08G 5/0095
See application file for complete search history.

(56) References Cited

U.S. PATENT DOCUMENTS

| | | | | |
|---|---|---|---|---|
| 6,023,668 | A | 2/2000 | Genoux | |
| 2018/0075757 | A1 | 3/2018 | Estes | |
| 2022/0015102 | A1 * | 1/2022 | Gallagher | H04B 7/1855 |

FOREIGN PATENT DOCUMENTS

| | | |
|---|---|---|
| EP | 2541505 | 1/2013 |

OTHER PUBLICATIONS https://www.researchgate.net/publication/305403993_Large-Scale_Flight_Phase_Identification_from_ADS-B_Data_Using_Machine_Learning_Methods.
Extended European Search Report for EP 23158456.6-1009, dated Jul. 17, 2023.

* cited by examiner

*Primary Examiner* — Yufeng Zhang

(74) *Attorney, Agent, or Firm* — Joseph M. Butscher; The Small Patent Law Group LLC

(57) ABSTRACT

A system and a method include a phase determination control unit configured to receive position data of an aircraft, determine variables from messages received from the aircraft, apply fuzzy logic to the variables to determine scores for possible phases of flight of the aircraft, identify a highest score among the possible phases of flight, and determine the highest score as an actual phase of flight of the aircraft.

20 Claims, 4 Drawing Sheets

150

152

154

| | Altitude | Rate of climb | Speed | Acceleration | Distance to origin | Distance to destination |
|---|---|---|---|---|---|---|
| *Ground* | *Ground* | | *Low* | | | |
| *Climb* | *Low* | *Positive* | *Medium* | | Low | |
| *Cruise* | *High* | *Zero* | *High* | | | |
| *Descent* | *Low* | *Negative* | *Medium* | | High | Low |
| Takeoff | | Zero | Low | Positive | Low | |
| Landing | | Zero | | | High | |
| Taxi-in | | Zero | Low | | High | |
| Taxi-out | | Zero | Low | | Low | |
| En Route Climb | High | Positive | High | | Medium | |
| En Route Descent | High | Negative | High | | | Medium |
| Approach | Low | | Medium | | | Very low??? |
| Go-around | | Positive | | Positive | | Low |
| Rejected take-off | | Zero | Low | Negative | Low | |

A

A

FIG. 3 | FIG. 3 Cont.

FIG. 3

A

| Onground | Onground change | In runway polygon | Glide slope (vspeed/speed) | Distance to IAF |
|---|---|---|---|---|
| Positive | | | | |
| Negative | | | Positive | |
| | | | | |
| | | | | |
| Positive | | Positive | | |
| Positive | Positive | Positive | | |
| Positive | | Negative | | |
| Positive | | Negative | | |
| | | | Positive | |
| | | | Negative | |
| | | | | Low |
| | | Positive | | |
| Positive | | | | |

A

FIG. 3 (cont.)

| FIG. 3 | FIG. 3 Cont. |
|---|---|

SYSTEMS AND METHODS FOR DETERMINING A PHASE OF FLIGHT OF AN AIRCRAFT

FIELD OF THE DISCLOSURE

Examples of the present disclosure generally relate to systems and methods for determining a phase of flight of an aircraft.

BACKGROUND OF THE DISCLOSURE

Aircraft are used to transport passengers and cargo between various locations. Numerous aircraft depart from and arrive at a typical airport every day.

Various phases of flight for an aircraft occur. For example, phases of flight for an aircraft include ground, climb, cruise, and descent. International Civil Aviation Organization (ICAO) and International Air Transport Association (IATA), for various purposes, define phases of a typical flight.

One known method relies on fuzzy logic to determine likelihoods, which in turn are used to select a phase with the greatest determined likelihood. Yet, the method is rudimentary and lacks robustness. For example, in the known method, an enroute climb event is automatically classed as a climb. Further, only four phases are identifiable by the known method, which may not provide enough information to particular end users.

SUMMARY OF THE DISCLOSURE

A need exists for a system and a method for efficiently and accurately determining a specific phase of flight of an aircraft. Further, a need exists for a system and a method for determining an increased number of phases of flight of an aircraft.

With those needs in mind, certain examples of the present disclosure provide a system including a phase determination control unit configured to: receive position data of an aircraft, determine variables from messages received from the aircraft, apply fuzzy logic to the variables to determine scores for possible phases of flight of the aircraft, identify a highest score among the possible phases of flight, and determine the highest score as an actual phase of flight of the aircraft. In at least one example, information about airport locations, air traffic structures, and the like are also analyzed to determine distance to and height above an airfield, for example.

In at least one example, the system also includes a monitoring sub-system in communication with the aircraft and the phase determination control unit. The monitoring sub-system is configured to monitor various aspects of the aircraft and generate the position data.

In at least one example, the phase determination control unit is further configured to control at least one aspect of the aircraft based on the actual phase of flight as determined by the phase determination control unit.

In at least one example, the variables comprise one or more of acceleration, distance to origin, distance to destination, onground, onground change, in runway polygon, glide slope, or distance to initial approach fix.

In at least one example, the phase determination control unit is further configured to associate the position data with a flight identifier of the aircraft.

In at least one example, messages include a momentary message and at least one trend message.

Certain examples of the present disclosure provide a method including receiving, by a phase determination control unit, position data of an aircraft; determining, by the phase determination control unit, variables from messages received from the aircraft; applying fuzzy logic, by the phase determination control unit, to the variables to determine scores for possible phases of flight of the aircraft; identifying, by the phase determination control unit, a highest score among the possible phases of flight; and determining, by the phase determination control unit, the highest score as an actual phase of flight of the aircraft.

Certain examples of the present disclosure provide a system including a plurality of aircraft, and a phase determination control unit configured to receive position data for each of the plurality of aircraft, determine variables from messages received from each of the plurality of aircraft, apply fuzzy logic to the variables to determine scores for possible phases of flight for each of the plurality of aircraft, identify a highest score among the possible phases of flight for each of the plurality of aircraft, and determine the highest score as an actual phase of flight for each of the plurality of aircraft.

BRIEF DESCRIPTION OF THE DRAWINGS

FIG. 3 illustrates a fuzzy logic estimator chart, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
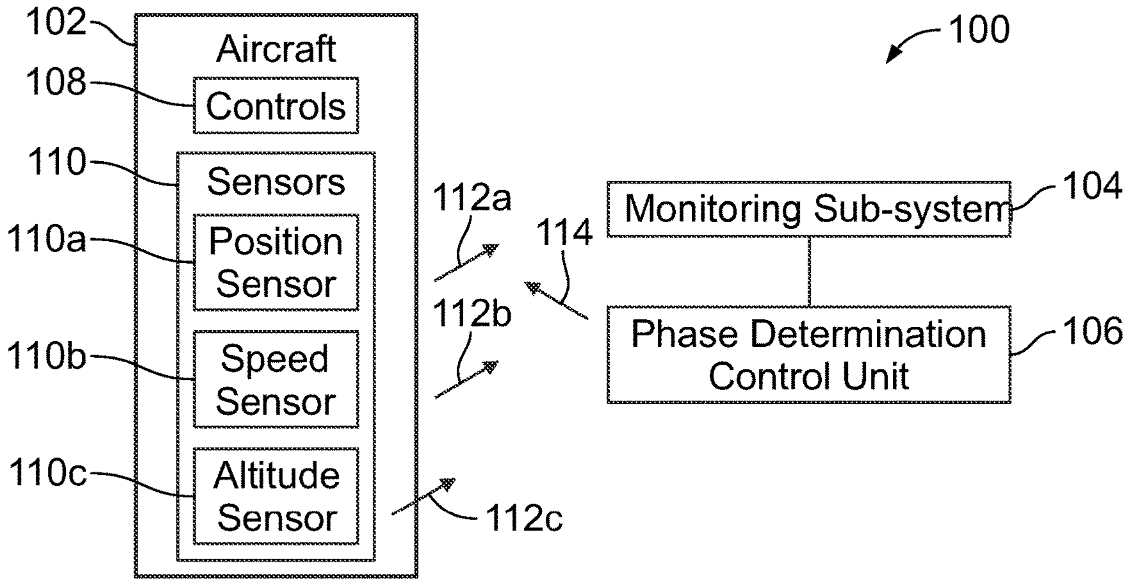
FIG. 1 illustrates a schematic block diagram of a system for determining a phase of flight of an aircraft, according to an example of the present disclosure.

FIG. 1 illustrates a schematic block diagram of a system 100 for determining a phase of flight of an aircraft 102, according to an example of the present disclosure. The system 100 includes a monitoring sub-system 104 configured to monitor various aspects of the aircraft 102, such as an altitude, speed, position, and/or the like. In at least one example, the monitoring sub-system 104 includes one or more computer workstations having or more processors. The monitoring sub-system 104 is in communication with the aircraft 102, such as through an antenna, a radio unit, a transceiver, a radar system, an automatic dependent surveillance-broadcast (ADS-B) system, and/or the like. In at least one example, the monitoring sub-system 104 can be located at an air traffic control center.

A phase determination control unit 106 is in communication with the monitoring sub-system 104, such as through one or more wired or wireless connections. In at least one example, the phase determination control unit 106 is at the same location as the monitoring sub-system 104. As a further example, the phase determination control unit 106 is part of the monitoring sub-system 104. As another example, the phase determination control unit 106 is remote from the monitoring sub-system 104. In at least one other example, the phase determination control unit 106 is in communication with the aircraft 102 to determine various aspects of the aircraft 102. In this manner, the phase determination control unit 106 can provide a monitoring sub-system (instead of being in communication with a separate and distinct monitoring sub-system).

As shown, the monitoring sub-system 104 monitors the aircraft 102, and the phase determination control unit 106 is configured to determine a phase of flight of the aircraft 102 based on various monitored aspects of the aircraft 102. While a single aircraft 102 is shown, the monitoring sub-system 104 can be used to monitor numerous aircraft 102, and the phase determination control unit 106 can be configured to determine the phases of flight of the numerous aircraft 102.

The aircraft 102 includes controls 108 that are configured to control operation of the aircraft 102. For example, the controls 108 include one or more of a control handle, yoke, joystick, control surface controls, accelerators, decelerators, and/or the like.

The aircraft 102 further includes a plurality of sensors 110 that detect various aspects of the aircraft 102. The various aspects can be output by the aircraft as messages, such as via broadcasted signals. The signals output by the sensors 110 can be messages. As another example, a message can include information from numerous signals. As another example, the monitoring sub-system 104 can compile the various signals and output a message regarding the aircraft.

As an example, a position sensor 110*a* outputs a position signal 112*a* of the aircraft. The monitoring subs-system 104 receives the position signal 112*a* and determines a position of the aircraft 102 within an airspace. As an example, the position signal 112*a* can be an ADS-B signal that is received and monitoring by an ADS-B monitor of the monitoring sub-system 104. As another example, the monitoring sub-system 104 monitors the position of the aircraft 102 through radar. As another example, the position signal 112*a* can be a global positioning system (GPS) signal that is monitored by a corresponding GPS monitor of the monitoring sub-system 104. In at least one example, GPS allows for determination of position, and ADS-B provides a transmission system to broadcast the position, which can be determined through GPS and/or inertial sensors.

A speed sensor 110*b* of the aircraft 102 outputs a speed signal 112*b* indicative of a ground and/or air speed of the aircraft 102. The monitoring sub-system 104 receives the speed signal 112*b* and determines the speed of the aircraft 102.

An altitude sensor 110*c* of the aircraft 102 outputs an altitude signal 112*c* indicative of an altitude of the aircraft 102. The monitoring sub-system 104 receives the altitude signal 112*b* and determines the altitude of the aircraft 102.

The sensors 110 can include more or less sensors than shown. The sensors 110 can detect additional aspects of the aircraft 102 other than position, speed, and altitude. For example, one or more temperature sensors can detect temperatures of one or more portions of the aircraft (such as engine temperature sensors). As another example, fuel level sensors can detect a remaining fuel level of the aircraft.

The phase determination control unit 106 analyzes the aspects of the aircraft 102, such as monitored by the monitoring sub-system 104, to determine a particular phase of flight of the aircraft 102. For example, the phase determination control unit 106 determines the phase of flight of the aircraft 102 based on a detected position, speed, and/or altitude of the aircraft 102 at any given time.

In at least one further example, the phase determination control unit 106 is configured to control operation of the aircraft 102 based on the determined phase of flight of the aircraft 102. The phase determination control unit 106 can be further configured to control at least one aspect of the aircraft 102 based on an actual phase of flight as determined by the phase determination control unit 106. For example, the phase determination control unit 106 first determines the phase of flight of the aircraft 102. Based on the determined phase of flight of the aircraft 102, the phase determination control unit 106 outputs a control signal 114, which is received by the aircraft 102 (for example, a flight computer of the aircraft 102). The control signal 114 can automatically operate the controls 108 of the aircraft 102. In this manner, the phase determination control unit 106 can automatically operate the aircraft 102 based on the determined phase of flight of the aircraft 102. Optionally, the phase determination control unit 106 may not be configured to automatically control operation of the aircraft 102.

In at least one example, the phase determination control unit 106 logically derives or otherwise determines the phase of flight of the aircraft 102. In contrast to the prior known method, the systems and methods of the present disclosure provide and utilize more variables for determining phases of flight, and also provide additional phases to be recognized. In at least one example, the phase determination control unit analyzes static navigation data and cached data to provide greater insights into more detailed, harder to differentiate phases of flight, as well as to increase robustness of the logic. Examples of the present disclosure provide systems and methods that derive and determine more detailed phases of flight, thereby providing increased service quality and operability.

In at least one example, the phase determination control unit 106 analyzes static navigation data (for example, coordinates of origin, destination, runway coordinates, and the like) as well as trend data to determine a non-static state, namely a particular phase of flight. The phase determination control unit analyzes one or more variables to derive and/or otherwise determine phases of flight. Consequently, more detailed phases of flight can be determined, and such phases can be more readily differentiated from one another.

In at least one example, the phase determination control unit 106 applies fuzzy logic to a unique set of variables and existing data. Examples of the present disclosure provide systems and methods that solve the challenge of accurately identifying a larger number of phases of flight.

As described herein, the phase determination control unit 106 creates a plurality of variables for the aircraft, such as acceleration, distance to origin, distance to destination, onground, onground change, in runway polygon, glide slope, and/or distance to initial approach fix. The phase determination control unit 106 uses static navigation data as well as trend data to determine a non-static state (for example, the phase of flight). The phase determination control unit 106 uses the variables to determine the phase of flight of the aircraft 102. The systems and methods according to examples of the present disclosure are able to determine more detailed phases, which provide better information for differentiation.

In at least one example, the system 100 includes the phase determination control unit 106, which receives position data (for example, real time, actual position data) of the aircraft 102. The phase determination control unit 106 associates the position data with a flight identifier of the aircraft 102. The flight identifier can be or include a flight number, a tail number of the aircraft, and/or the like. The phase determination control unit 106 links the received position data with the aircraft 102 associated with the position data. The phase determination control unit 106 determines variables from messages received from the aircraft 102. The messages include information that includes one or more of position, speed, altitude, and/or the like of the aircraft 102. The messages can include momentary messages (for example, current, real time data), and trend messages (for example, messages received prior to the momentary messages). The phase determination control unit 106 then applies fuzzy logic to the variables to determine scores for possible phases of flight. The phase determination control unit 106 then determines and identifies the actual phase of flight as the possible phase having the highest score.

As described herein, the system 100 includes the phase determination control unit 106, which is configured to receive position data of the aircraft 102, determine variables from messages received from the aircraft 102, apply fuzzy logic to the variables to determine scores for possible phases of flight of the aircraft 102, identify a highest score among the possible phases of flight, and determine the highest score as an actual phase of flight of the aircraft 102.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the phase determination control unit 106 may be or include one or more processors that are configured to control operation, as described herein.

The phase determination control unit 106 is configured to execute a set of instructions that are stored in one or more data storage units or elements (such as one or more memories), in order to process data. For example, the phase determination control unit 106 may include or be coupled to one or more memories. The data storage units may also store data or other information as desired or needed. The data storage units may be in the form of an information source or a physical memory element within a processing machine.

The set of instructions may include various commands that instruct the phase determination control unit 106 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the phase determination control unit 106. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the phase determination control unit 106 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
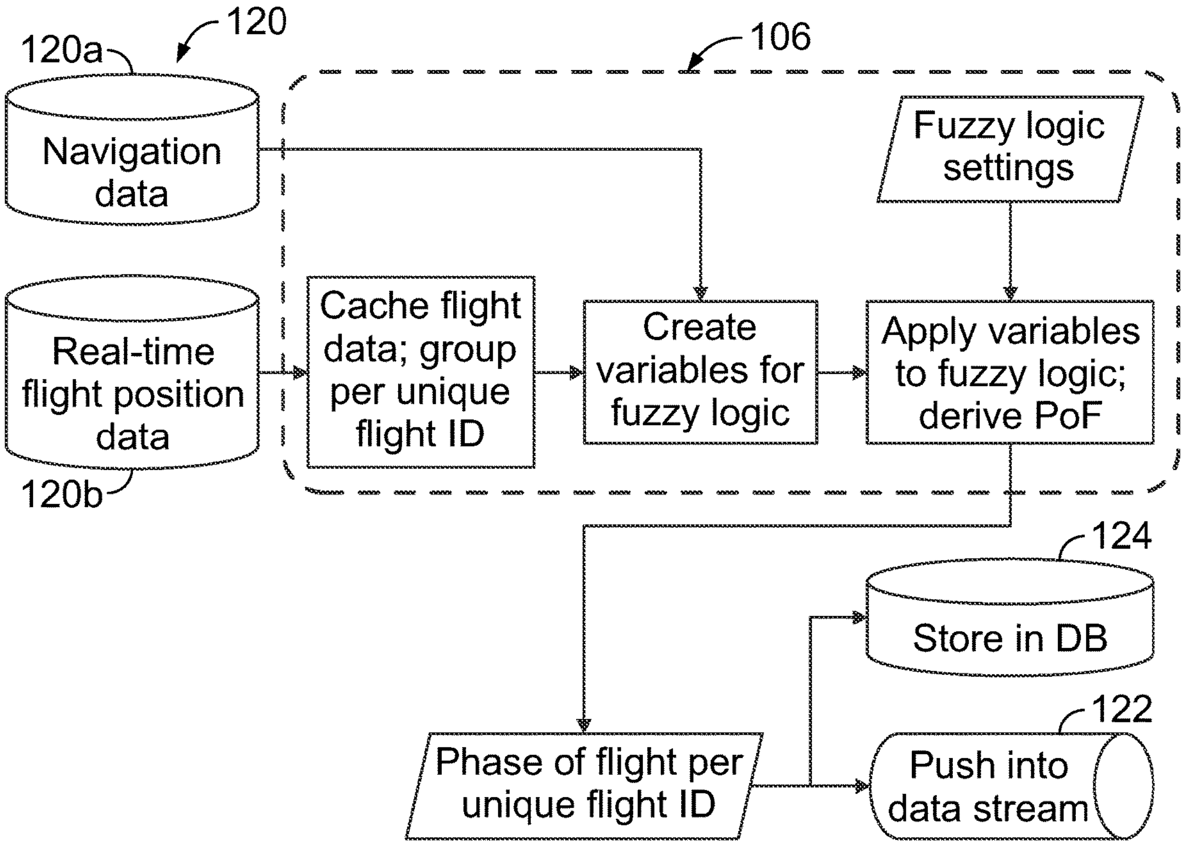
FIG. 2 illustrates a schematic diagram of a phase determination control unit, according to an example of the present disclosure.

FIG. 2 illustrates a schematic diagram of the phase determination control unit 106, according to an example of the present disclosure. Referring to FIGS. 1 and 2, the phase determination control unit 106 receives aspect data 120 regarding the aircraft 102. In at least one example, the monitoring sub-system 104 provides the aspect data 120 to the phase determination control unit 106. As another example, the phase determination control unit 106 receives the aspect data 120 directly from the aircraft 102, such as through communication with the sensors 110 of the aircraft 102. As shown, the aspect data 120 can include navigation data **120*a* regarding the aircraft 102 and position data 120*b* regarding the aircraft 102**.

In at least one example, the phase determination control unit 106 caches the position data **120*b*, and groups the position data in relation to a unique flight identifier that is associated with a flight of the aircraft 102. Based on the received navigation data 120*a* and the position data 120*b*, as cached and grouped per the unique flight identifier, the phase determination control unit 106 creates variables for fuzzy logic. Various settings for phases of flight are stored in a memory, which stores fuzzy logic settings. The phase determination control unit 106 applies the created variables in relation to the fuzzy logic settings to determine the phase of flight of the aircraft 102. The phase determination control unit 106 then outputs the phase of flight of the aircraft 102, which is associated with the unique flight identifier, which can be pushed into a data stream 122 and/or stored in a database 124**.

As shown in FIG. 2, in at least one example, the system and method analyze real-time flight position data **120*b*, and aeronautical navigation data 120*a* to determine the phase of flight of the aircraft 102**. The aeronautical navigation data can be quasi-static due to cycles as determined by Aeronautical Information Regulation and Control (AIRAC).

As noted, initially, the phase determination control unit 106 first caches the flight position data **120*b* and associates the flight position data 120*b* with a flight identifier, which identifies the particular aircraft 102 (and optionally the particular fight of the aircraft 102). The phase determination control unit 106 associates the flight position data 120*b*** with the flight identifier because every flight is to be inspected separately to determine its unique phase of flight.

Next, the phase determination control unit 106 determines variables. The variables include two types: variables that can be directly drawn from a most recent message from the aircraft 102 (referred to as momentary variables) and other variables that are derived from a trend of a predetermined number of prior messages (referred to as trend variables). For example, a momentary variable is the last message received from the aircraft (that is, the most recent message indicative of one or more actual, real time aspects of the aircraft), while the trend variables are a predetermined number (such as 5, 10, 20, or more) messages received before the last message. The trend variables are prior messages that may not reflect one or more real time, actual aspects of the aircraft.

As an example, a momentary variable is or otherwise includes binary information to the question "Is the aircraft currently on the ground?" Such question logically has only a "yes" or "no" answer, and requires the most recent (in particular, actual) flight position message. A trend variable is or otherwise includes the information to the question "Has the aircraft left the ground?" Such question can only be answered if the phase determination control unit 106 analyzes the current and at least one other (for example, the second most recent message) past message and determines the change of the on ground information. If, for example, this switches from 1 to 0 (or True to False), then this question is answered with a "yes."

The phase determination control unit 106 applies fuzzy logic to the variables and generates for all the phases of flight each a score between 0 and 1, with 0 being the least likelihood of a flight being in that particular phase, and 1 being the highest possible likelihood of being in the particular phase. In general, the phase determination control unit 106 determines the phase of the flight by determining the highest score (that is, closest to 1), and selects the determined actual phase of flight accordingly. The phase determination control unit 106 repeats this process in real-time (as the data stream is constantly delivering data) and produces this phase of flight data output for each flight in question. The data can then be stored in the database 124 and/or pushed into the data stream 122 itself.

FIG. 3 illustrates a fuzzy logic estimator chart 150, according to an example of the present disclosure. The fuzzy logic estimator chart 150 represents fuzzy logic settings as stored in a memory of, or otherwise in communication with, the phase determination control unit 106. The fuzzy logic estimator chart 150 includes a phase column 152 providing a plurality of phases of flight, including ground, climb, cruise, descent, takeoff, landing, taxi-in, taxi-out, enroute climb, enroute descent, approach, go-around, a rejected takeoff.

A first subset 154 of phases (including ground, climb, cruise, and descent) are the four phases with a corresponding logic. For example, for the ground phase, the phase determination control unit analyzes as follows: "If altitude is ground AND speed is low, then . . . "). The terms high, low, medium, and the like can be initially empirically determined. For example, such terms can be associated with predetermined magnitudes. The phase determination control unit 106 can further analyze historical data for the various phases to further refine the magnitudes for such terms. In the Ground example, the "Ground" curve is selected for altitude, while the "Low" curve is selected as a variable representing speed. After the terms and magnitudes are determined and associated with the various phases (such as through pre-programming, and/or by the phase determination control unit 106), the real-time flight position data **120*b* (shown in FIG. 2) is then received by the phase determination control unit 106, which compares such data in relation to the logic shown and described in FIG. 3. The phase determination control unit 106 analyzes the real time position data 120*b* with respect to each listed phase shown in the phase column 152 to determine a score with respect to each phase. The phase determination control unit 106 determines an end score on the likelihood of that phase being the current one, with the greatest score winning (for example, the score closest to 1), and the phase determination control unit 106** then selects the highest score as the actual phase of flight.

In at least one example, the phase determination control unit 106 creates the variables. The variables include acceleration, distance to origin, distance to destination, onground, onground change, in runway polygon, in glide slope, distance to initial approach fix, and the like. As an example, the phase determination control unit 106 determines acceleration as the difference of the actual (that is, most recent) speed value of a flight message with a speed value of a past message, (for example, the immediately preceding), divided by the difference in timestamps of the two messages.

As an example, the phase determination control unit 106 determines the distance to origin as a circular (or radial) distance between a current position of the aircraft 102 (in terms of latitude and longitude) and origin airport. The origin field of the current message is used to retrieve the latitude and longitude values of the airport from the navigation data.

As an example, the phase determination control unit 106 determines the distance to destination as a circular (or radial) distance between the current position or the aircraft and the destination airport. The destination field of the current is used to retrieve the latitude and longitude values of the airport from the navigation data.

As an example, the phase determination control unit 106 determines onground as the data field value of the current message.

As an example, the phase determination control unit 106 determines the onground change as the discrepancy of the onground value of the current message to any field of a prior message (such as from 1 to 0, or vice versa).

As an example, in runway polygon, the phase determination control unit 106 determines a logical true or false from the latitude and longitude of the current message compared to runway polygons of origin and destination airport and evaluated for intersections.

As an example, the phase determination control unit 106 determines a trend, such as glide slope, as a numerical value, such as by analyzing the speed of the current message and monitoring the change of which as compared to prior messages.

As an example, the phase determination control unit 106 determines distance to initial approach fix as a location of the current message (such as described by latitude and longitude), which can be used to determine the distance to all initial approach fixes of the destination airport.

As described above, the phase determination control unit 106 creates a plurality of variables for the aircraft, such as acceleration, distance to origin, distance to destination, onground, onground change, in runway polygon, glide slope, and/or distance to initial approach fix. The phase determination control unit 106 uses static navigation data as well as the trend data to determine a non-static state (for example, the phase of flight). The phase determination control unit 106 uses the variables to determine the phase of flight of the aircraft 102. The systems and methods according to examples of the present disclosure are able to determine more detailed phases, which provide better information for differentiation.

Referring to FIGS. 1-3, in at least one example, the phase determination control unit 106 can further control, at least in part, the controls 108 of the aircraft 102 to operate the aircraft 102 based on the determined phase of flight. For example, based on a determined phase of flight, the phase determination control unit 106 may operate the controls 108 to increase or decrease ground or airspeed of the aircraft in relation to a predetermined speed threshold. As another example, based on a determined phase of flight, the phase determination control unit 106 may operate the controls 108 to increase or decrease altitude of the aircraft 102 in relation to a predetermined altitude threshold.

Examples of the subject disclosure provide systems and methods that allow large amounts of data to be quickly and efficiently analyzed by a computing device. For example, the phase determination control unit 106 can analyze various aspects of various flights of numerous aircraft. Further, the phase determination control unit 106 creates variables based on the various aspects, and determines various phases of flight from the variables, which can be in a format not readily discernable by a human being. As such, large amounts of data, which may not be discernable by human beings, are being tracked and analyzed. The vast amounts of data are efficiently organized and/or analyzed by the phase determination control unit 106, as described herein. The phase determination control unit 106 analyzes the data in a relatively short time in order to quickly and efficiently phased of flight in real time. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one embodiment, components of the system 100, such as the phase determination control unit 106, provide and/or enable a computer system to operate as a special computer system for determining phases of flight of aircraft. The phase determination control unit 106 improves upon computing devices that use fuzzy logic by allowing for the creation of variables, which further allows for numerous additional phases of flight to be discerned.

Figure 4:
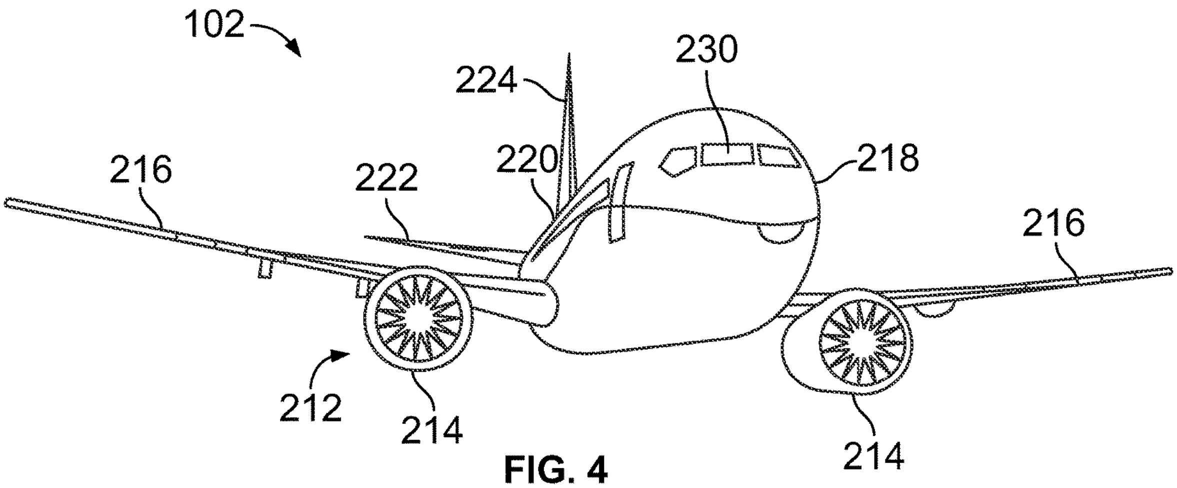
FIG. 4 illustrates a perspective front view of an aircraft, according to an example of the present disclosure.

FIG. 4 illustrates a perspective front view of an aircraft 102, according to an example of the present disclosure. The aircraft 102 includes a propulsion system 212 that includes engines 214, for example. Optionally, the propulsion system 212 may include more engines 214 than shown. The engines 214 are carried by wings 216 of the aircraft 102. In other embodiments, the engines 214 may be carried by a fuselage 218 and/or an empennage 220. The empennage 220 may also support horizontal stabilizers 222 and a vertical stabilizer 224. The fuselage 218 of the aircraft 102 defines an internal cabin 230, which includes a flight deck or cockpit, one or more work sections (for example, galleys, personnel carry-on baggage areas, and the like), one or more passenger sections (for example, first class, business class, and coach sections), one or more lavatories, and/or the like. FIG. 4 shows an example of an aircraft 102. It is to be understood that the aircraft 102 can be sized, shaped, and configured differently than shown in FIG. 4.

Figure 5:
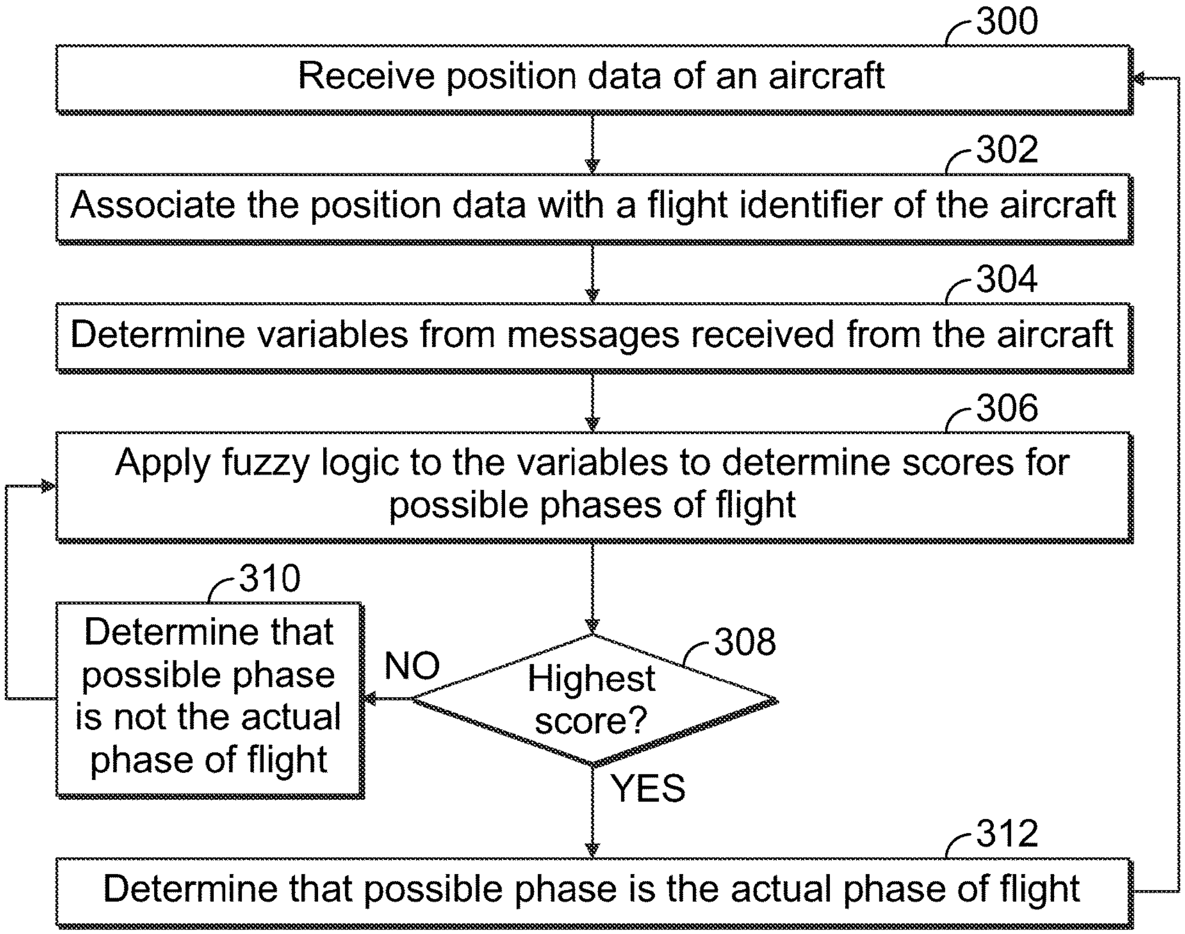
FIG. 5 illustrates a flow chart of a method for determining a phase of flight of an aircraft, according to an example of the present disclosure.

FIG. 5 illustrates a flow chart of a method for determining a phase of flight of an aircraft, according to an example of the present disclosure. Referring to FIGS. 1 and 5, at 300, the phase determination control unit 106 receives position data of an aircraft 102. The position data can be received directly from the aircraft 102, or from the monitoring sub-system 104. At 302, the phase determination control unit 106 associates the position data with a flight identifier of the aircraft 102.

At 304, the phase determination control unit determines variables from messages received from the aircraft 102. In at least one example, at 304, position data can be set into relation to air traffic structure, such as runways, airport coordinates, and the like. At 306, the phase determination control unit 106 applies fuzzy logic to the variables to determine scores for possible phases of flight. The possible phases of flight can include all potential phases of flight from and between a departure airport and an arrival airport. At 308, the phase determination control unit 106 determines if a possible phase has a highest score. If not, the method proceeds to 310, at which the phase determination control unit 106 determines that the possible phase is not the actual phase of flight of the aircraft 102. The method may then return to 306. If after comparing the scores for all possible phases the phase determination control unit 106 determines that a possible phase has the highest score, the phase determination control unit 106 determines that the possible phase having the highest score is the actual phase of flight at 312. The method then returns to 300.

Further, the disclosure comprises examples according to the following clauses:

Clause 1. A system comprising:

a phase determination control unit configured to:
- receive position data of an aircraft;
- determine variables from messages received from the aircraft;
- apply fuzzy logic to the variables to determine scores for possible phases of flight of the aircraft;
- identify a highest score among the possible phases of flight; and
- determine the highest score as an actual phase of flight of the aircraft.

Clause 2. The system of Clause 1, further comprising a monitoring sub-system in communication with the aircraft and the phase determination control unit, wherein the monitoring sub-system is configured to monitor various aspects of the aircraft and generate the position data.

Clause 3. The system of Clauses 1 or 2, wherein the phase determination control unit is further configured to control at least one aspect of the aircraft based on the actual phase of flight as determined by the phase determination control unit.

Clause 4. The system of any of Clauses 1-3, wherein the variables comprise one or more of acceleration, distance to origin, distance to destination, onground, onground change, in runway polygon, glide slope, or distance to initial approach fix.

Clause 5. The system of any of Clauses 1-4, wherein the variables comprise acceleration, distance to origin, distance to destination, onground, onground change, in runway polygon, glide slope, and distance to initial approach fix.

Clause 6. The system of any of Clauses 1-5, wherein the phase determination control unit is further configured to associate the position data with a flight identifier of the aircraft.

Clause 7. The system of any of Clauses 1-6, wherein the messages comprise a momentary message and at least one trend message.

Clause 8. A method comprising:

receiving, by a phase determination control unit, position data of an aircraft;

determining, by the phase determination control unit, variables from messages received from the aircraft;

applying fuzzy logic, by the phase determination control unit, to the variables to determine scores for possible phases of flight of the aircraft;

identifying, by the phase determination control unit, a highest score among the possible phases of flight; and determining, by the phase determination control unit, the highest score as an actual phase of flight of the aircraft.

Clause 9. The method of Clause 8, further comprising:

monitoring, by a monitoring sub-system in communication with the aircraft and the phase determination control unit, various aspects of the aircraft; and generating, by the monitoring sub-system, the position data.

Clause 10. The method of Clauses 8 or 9, further comprising controlling, by the phase determination control unit, at least one aspect of the aircraft based on the actual phase of flight as determined by the phase determination control unit.

Clause 11. The method of any of Clauses 8-10, wherein the variables comprise one or more of acceleration, distance to origin, distance to destination, onground, onground change, in runway polygon, glide slope, or distance to initial approach fix.

Clause 12. The method of any of Clauses 8-11, wherein the variables comprise acceleration, distance to origin, distance to destination, onground, onground change, in runway polygon, glide slope, and distance to initial approach fix.

Clause 13. The method of any of Clauses 8-12, further comprising associating, by the phase determination control unit, the position data with a flight identifier of the aircraft.

Clause 14. The method of any of Clauses 8-13, wherein the messages comprise a momentary message and at least one trend message.

Clause 15. A system comprising:

a plurality of aircraft; and a phase determination control unit configured to:

receive position data for each of the plurality of aircraft;

determine variables from messages received from each of the plurality of aircraft;

apply fuzzy logic to the variables to determine scores for possible phases of flight for each of the plurality of aircraft;

identify a highest score among the possible phases of flight for each of the plurality of aircraft; and determine the highest score as an actual phase of flight for each of the plurality of aircraft.

Clause 16. The system of Clause 15, further comprising a monitoring sub-system in communication with the plurality of aircraft and the phase determination control unit, wherein the monitoring sub-system is configured to monitor various aspects of the plurality of aircraft and generate the position data for each of the plurality of aircraft.

Clause 17. The system of Clauses 15 or 16, wherein the phase determination control unit is further configured to control at least one aspect of one or more of the plurality of aircraft based on the actual phase of flight as determined by the phase determination control unit.

Clause 18. The system of any of Clauses 15-17, wherein the variables comprise one or more of acceleration, distance to origin, distance to destination, onground, onground change, in runway polygon, glide slope, or distance to initial approach fix.

Clause 19. The system of any of Clauses 15-18, wherein the variables comprise acceleration, distance to origin, distance to destination, onground, onground change, in runway polygon, glide slope, and distance to initial approach fix.

Clause 20. The system of any of Clauses 15-19, wherein the messages comprise a momentary message and at least one trend message.

As described herein, examples of the present disclosure provide systems and method for efficiently and accurately determining a specific phase of flight of an aircraft. Further, examples of the present disclosure provide systems and methods for determining an increased number of phases of flight of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a phase determination control unit configured to:

receive aspect data of an aircraft, wherein the aspect data includes navigation data regarding the aircraft, and position data regarding the aircraft;

cache the position data;

associate the position data, as cached, with a flight identifier that identifies the aircraft and a particular flight of the aircraft;

create variables from the navigation data, the position data, and messages received from the aircraft;

apply fuzzy logic to the variables to determine scores for possible phases of flight of the aircraft;

identify a highest score among the possible phases of flight; and determine the highest score as an actual phase of flight of the aircraft.

2. The system of claim 1, further comprising a monitoring sub-system in communication with the aircraft and the phase determination control unit, wherein the monitoring sub-system is configured to monitor various aspects of the aircraft and generate the aspect data.

3. The system of claim 1, wherein the phase determination control unit is further configured to control at least one aspect of the aircraft based on the actual phase of flight as determined by the phase determination control unit.

4. The system of claim 1, wherein the variables comprise one or more of acceleration, distance to origin, distance to destination, onground, onground change, in runway polygon, glide slope, or distance to initial approach fix, wherein the onground includes a data field of a current message, and wherein the onground change includes a discrepancy of the onground in relation to any field of a prior message.

5. The system of claim 1, wherein the variables comprise acceleration, distance to origin, distance to destination, onground, onground change, in runway polygon, glide slope, and distance to initial approach fix, wherein the onground includes a data field of a current message, and wherein the onground change includes a discrepancy of the onground in relation to any field of a prior message.

6. The system of claim 1, wherein the messages comprise a momentary message and at least one trend message, wherein the momentary message comprises current, real time data, and wherein the at least one trend message comprises information received prior to the momentary message.

7. A method comprising:

receiving, by a phase determination control unit, aspect data of an aircraft, wherein the aspect data includes navigation data regarding the aircraft, and position data regarding the aircraft;

caching, by the phase determination control unit, the position data;

associating, by the phase determination control unit, the position data, as cached, with a flight identifier that identifies the aircraft and a particular flight of the aircraft;

creating by the phase determination control unit, variables from the navigation data, the position data, and messages received from the aircraft;

applying fuzzy logic, by the phase determination control unit, to the variables to determine scores for possible phases of flight of the aircraft;

identifying, by the phase determination control unit, a highest score among the possible phases of flight; and determining, by the phase determination control unit, the highest score as an actual phase of flight of the aircraft.

8. The method of claim 7, further comprising:

monitoring, by a monitoring sub-system in communication with the aircraft and the phase determination control unit, various aspects of the aircraft; and generating, by the monitoring sub-system, the aspect data.

9. The method of claim 7, further comprising controlling, by the phase determination control unit, at least one aspect of the aircraft based on the actual phase of flight as determined by the phase determination control unit.

10. The method of claim 7, wherein the variables comprise one or more of acceleration, distance to origin, distance to destination, onground, onground change, in runway polygon, glide slope, or distance to initial approach fix, wherein the onground includes a data field of a current message, and wherein the onground change includes a discrepancy of the onground in relation to any field of a prior message.

11. The method of claim 7, wherein the variables comprise acceleration, distance to origin, distance to destination, onground, onground change, in runway polygon, glide slope, and distance to initial approach fix, wherein the onground includes a data field of a current message, and wherein the onground change includes a discrepancy of the onground in relation to any field of a prior message.

12. The method of claim 7, wherein the messages comprise a momentary message and at least one trend message, wherein the momentary message comprises current, real time data, and wherein the at least one trend message comprises information received prior to the momentary message.

13. A system comprising:

a plurality of aircraft; and a phase determination control unit configured to:

receive aspect data for each of the plurality of aircraft, wherein the aspect data includes navigation data regarding each of the plurality of the aircraft, and position data regarding each of the plurality of the aircraft;

cache the position data for each of the plurality of the aircraft;

associate the position data, as cached, with a flight identifier that identifies each of the plurality of the aircraft and a particular flight of each of the plurality of the aircraft create variables from the navigation data, the position data, and messages received from each of the plurality of aircraft;

apply fuzzy logic to the variables to determine scores for possible phases of flight for each of the plurality of aircraft;

identify a highest score among the possible phases of flight for each of the plurality of aircraft; and determine the highest score as an actual phase of flight for each of the plurality of aircraft.

14. The system of claim 13, further comprising a monitoring sub-system in communication with the plurality of aircraft and the phase determination control unit, wherein the monitoring sub-system is configured to monitor various aspects of the plurality of aircraft and generate the aspect data for each of the plurality of aircraft.

15. The system of claim 13, wherein the phase determination control unit is further configured to control at least one aspect of one or more of the plurality of aircraft based on the actual phase of flight as determined by the phase determination control unit.

16. The system of claim 13, wherein the variables comprise one or more of acceleration, distance to origin, distance to destination, onground, onground change, in runway polygon, glide slope, or distance to initial approach fix, wherein the onground includes a data field of a current message, and wherein the onground change includes a discrepancy of the onground in relation to any field of a prior message.

17. The system of claim 13, wherein the variables comprise acceleration, distance to origin, distance to destination, onground, onground change, in runway polygon, glide slope, and distance to initial approach fix, wherein the onground includes a data field of a current message, and wherein the onground change includes a discrepancy of the onground in relation to any field of a prior message.

18. The system of claim 13, wherein the messages comprise a momentary message and at least one trend message, wherein the momentary message comprises current, real time data, and wherein the at least one trend message comprises information received prior to the momentary message.

19. The system of claim 1, wherein the phase determination control unit is further configured to analyze historical data for various phases to determine magnitudes for altitudes and speeds.

20. The method of claim 7, further comprising:

analyzing, by the phase determination control unit, historical data for various phases; and determining, by the phase determination control unit, magnitudes for altitudes and speeds from the historical data.

* * * * *